US011385963B1

(12) United States Patent
Benisty et al.

(10) Patent No.: US 11,385,963 B1
(45) Date of Patent: Jul. 12, 2022

(54) USAGE OF DATA MASK IN DRAM WRITE (71) Applicant: Western Digital Technologies, Inc., San Jose, CA (US)

(72) Inventors: Shay Benisty, Beer Sheva (IL); Adi Blum, Kibbutz Tzora (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/183,784

(22) Filed: Feb. 24, 2021

(51) Int. Cl.
*G06F 11/10* (2006.01)
*G06F 11/36* (2006.01)
*G06F 11/07* (2006.01)

(52) U.S. Cl.
CPC ...... *G06F 11/1068* (2013.01); *G06F 11/0772* (2013.01); *G06F 11/1048* (2013.01); *G06F 11/3656* (2013.01)

(58) Field of Classification Search
None
See application file for complete search history.

(56) References Cited

U.S. PATENT DOCUMENTS

| 4,817,095 A * | 3/1989 | Smelser ............... H03M 13/13 714/764 |
| 4,888,773 A * | 12/1989 | Arlington ............. G06F 11/106 714/764 |
| 5,907,512 A | 5/1999 | Parkinson et al. |
| 6,496,897 B2 | 12/2002 | Ware et al. |
| 7,844,888 B2 | 11/2010 | Nygren et al. |
| 9,218,286 B2 | 12/2015 | Biswas et al. |
| 10,037,246 B1 * | 7/2018 | Laws ..................... G11C 29/52 |
| 10,176,038 B2 | 1/2019 | Jeganathan et al. |
| 2005/0138302 A1 * | 6/2005 | Lusk ...................... G11C 29/48 711/154 |
| 2008/0168331 A1 * | 7/2008 | Vogelsang .......... G06F 11/1044 714/770 |

FOREIGN PATENT DOCUMENTS

JP 2018180656 A * 11/2018

* cited by examiner

*Primary Examiner* — April Y Blair
*Assistant Examiner* — Matthew W Wahlin
(74) *Attorney, Agent, or Firm* — Patterson + Sheridan, LLP; Steven H. Versteeg (57) ABSTRACT

A method and apparatus for masking errors in a DRAM write are disclosed to perform a partial write request with an SSD controller. In embodiments, write data from a host is provided to the controller that is not aligned to the DRAM data. The controller issues a read command from the LBA of a data storage device, and a corresponding write command to write the data received from the host, prior to receipt of the read data, to perform a partial write. The read data is error corrected, and in the event an error is found in the read data, bytes containing an error are masked. The read data, including masked read data, and write data are merged to form partial write data, and written to the DRAM. In certain embodiments, the partial write data may be provided to a logic analyzer to assess the masked read data for debug analysis.

20 Claims, 7 Drawing Sheets

USAGE OF DATA MASK IN DRAM WRITE

BACKGROUND OF THE DISCLOSURE

Field of the Disclosure

Embodiments of the present disclosure generally relate to a write data coherency, and more particularly, to partial write requests.

Description of the Related Art

Dynamic random access memory (DRAM) is commonly used in solid-state drives (SSDs) as a working memory, where the SSD controller may temporarily store data for quick access to FTL tables, XOR bins, cached data, and the like. Data stored in a DRAM is protected against erroneous bits by adding redundancy using error correction codes (ECC) that may be stored contiguously with the data to which it relates or separately. In the situation where the ECC is stored separately from the data, a series of transactions are issued by the device controller for fetching both the ECC and the data.

In certain situations, a controller performs a partial write operation based on a request from a host to an SSD, or from a component of the SSD to the controller. A partial write request is used when a controller needs to write data to the DRAM that is unaligned to DRAM data storage unit allocation (e.g., 128 bytes). The controller fetches the data and ECC bytes from the DRAM, uses the ECC to ensure the data is correct, merges the data with the host data to create a complete packet (i.e., aligned with DRAM data storage unit allocation), generate a new ECC for the merged data, then writes the merged data and new ECC to the DRAM.

In certain embodiments, the write command is issued directly after the read command, before the read command has fetched the data and has been merged with the host data. Conventionally, if there are errors in the read data, these will be written to the DRAM, as the write command has already been scheduled.

Therefore, there is a need for improved method and systems of executing partial write requests to improve data storage device performance and debugging operations.

SUMMARY OF THE DISCLOSURE

In the present disclosure, methods and systems are disclosed to perform a partial write request with an SSD controller. In embodiments, data from a host, or in some embodiments a component of the SSD, is provided to the controller that is not aligned to the DRAM data. The host data is merged with the DRAM data to be written to the DRAM, and one or more uncorrectable errors are detected in the read data. All bytes containing an error are masked before being written to the DRAM, and in some embodiments the controller writes debug information to the masked bytes. In these embodiments, the merged data is provided to a logic analyzer to read the debug data and provide corrective instructions for the controller.

In one embodiment, a data storage device is disclosed that includes one or more memory devices, and a controller configured to perform a method for masking errors in a dynamic random access memory (DRAM) write. In embodiments, the method includes issuing a read command for read data on a DRAM, issuing a write command to write data to the DRAM, and receiving the read data. The method further includes performing error detection on the read data and detecting an error in a byte, merging the read data with the write data to form partial write data, and aligning the partial write data using the read data. The method further includes masking the byte of the partial write data, and writing the masked partial write data to the DRAM.

In another embodiment, a controller for a data storage device is disclosed that includes an input/output (I/O) to one or more memory devices, and a processor configured to execute a method for masking errors in a dynamic random access memory (DRAM) write. In certain embodiments the method includes issuing a read command for read data, that includes read alignment data, issuing a write command, and detecting an error in read data. The method further includes masking bytes of the read data that are indicated as having an error, combining the read data and write data to form partial write data, and writing the partial write data to the one or more memory devices based on the read alignment data.

In another embodiment, a system for storing data is disclosed that includes one or more memory means, and a controller means configured to carry out a method for masking errors in a dynamic random access memory (DRAM) write. In certain embodiments the method includes executing a partial write command that includes issuing a read data command, issuing a write command comprising write data, and receiving read data from the one or more memory means. The partial write command includes receiving byte alignment data, modifying the write data based on the byte alignment data, detecting an error in a byte of the modified read data, masking the byte, and combining the read data, write data, and masked byte.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

In the present disclosure, methods and systems are disclosed to perform a partial write request with an SSD controller. In embodiments, data from a host is provided to the controller that is not aligned to the DRAM data. The host data is merged with the DRAM data, to be written to the DRAM, and one or more uncorrectable errors are detected in the merged data. All bytes containing an error are masked before being written to the DRAM, and in some embodiments, the controller writes debug information to the masked bytes. In these embodiments, the merged data is provided to a logic analyzer to read the debug data and provide corrective instructions for the controller.

Figure 1:
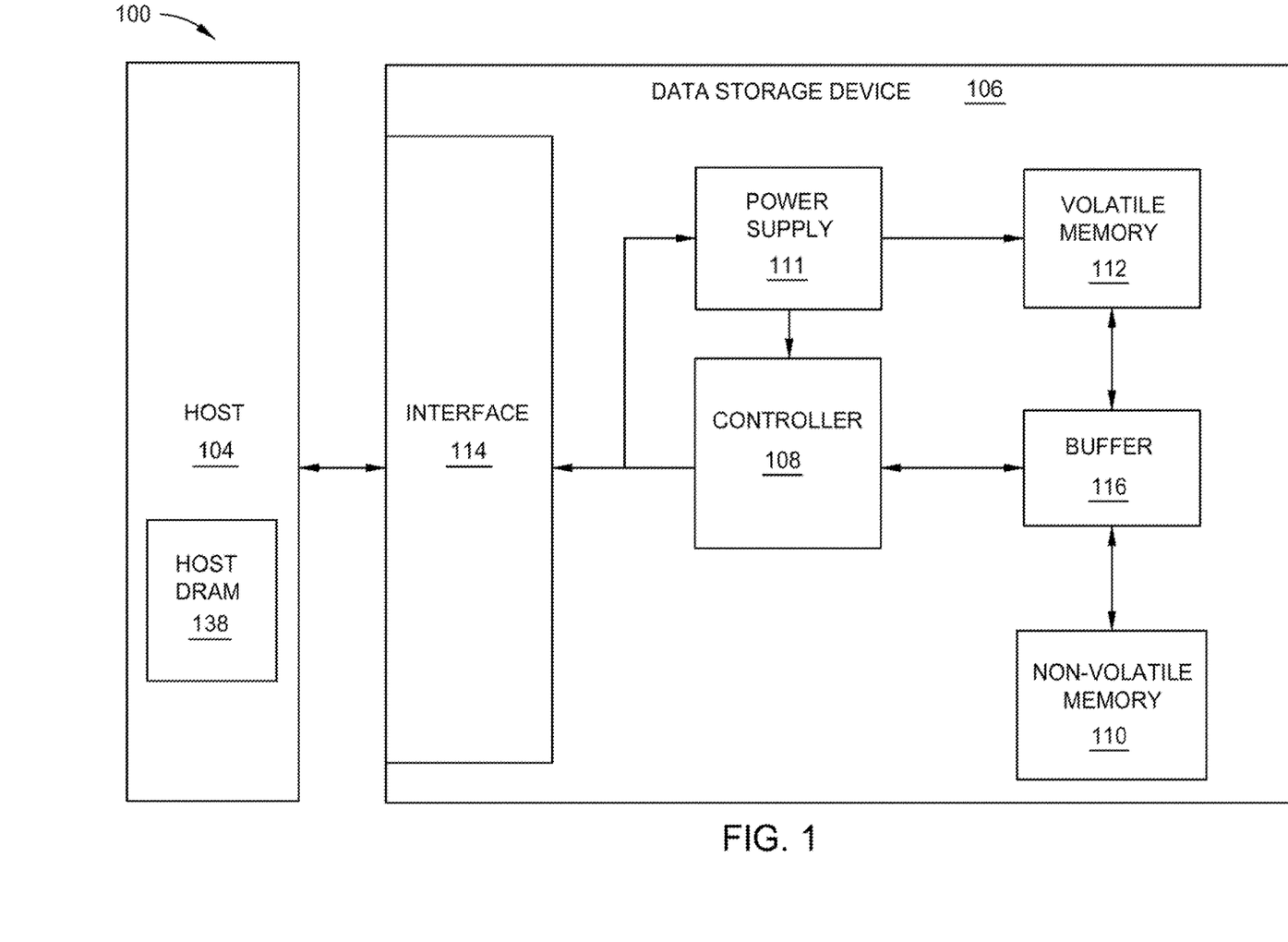
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
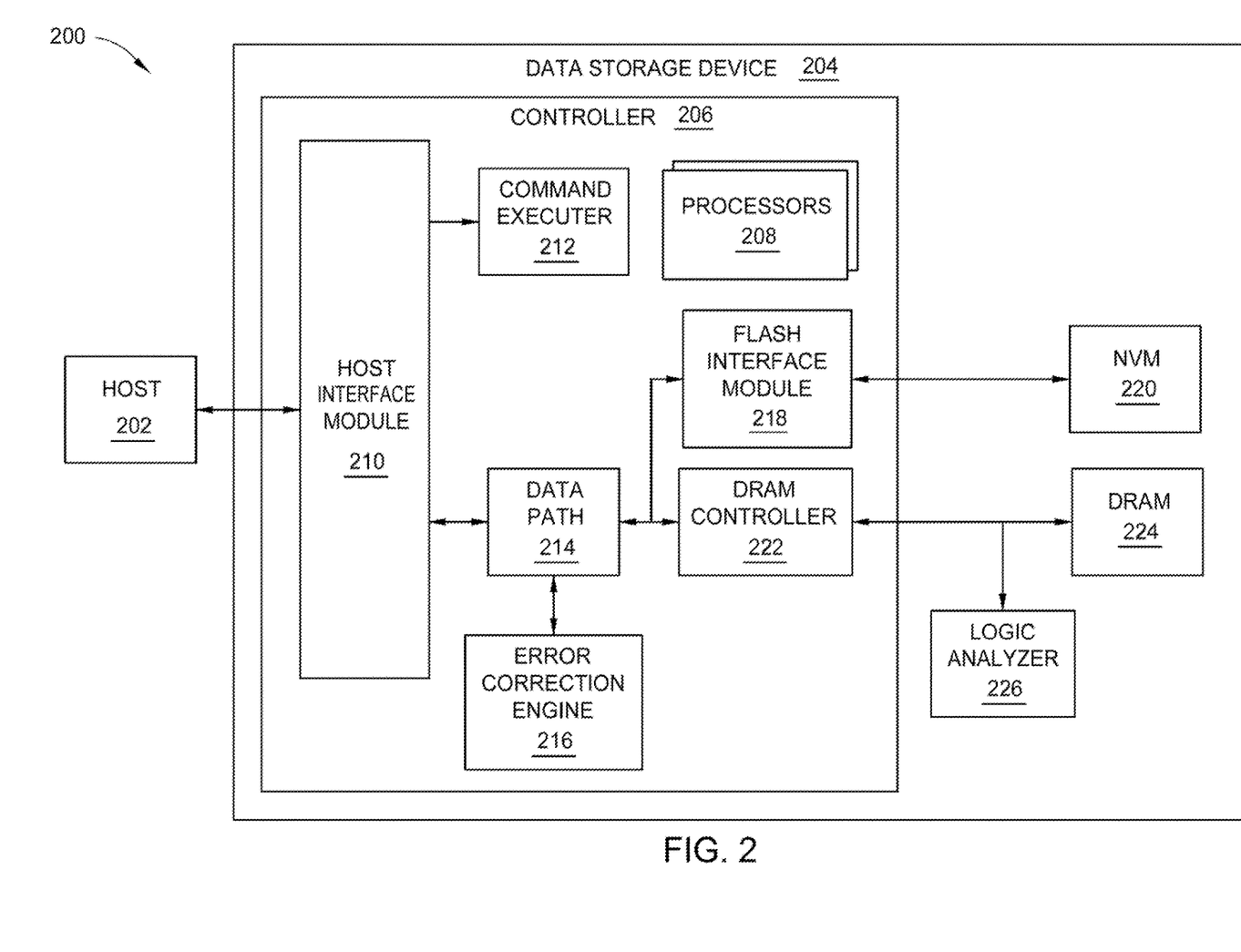
FIG. 2 depicts a schematic block diagram illustrating a high level block diagram of a device controller in a data storage device, according to certain embodiments.

FIG. 2 depicts a schematic block diagram 200 illustrating a high level block diagram of a device controller 206 in a data storage device 204, according to certain embodiments. Aspects of the storage system 100 may be similar to those described in FIG. 2. A host device 202 may be the host device 104. The data storage device 204 may be the data storage device 106, and the controller 206 may be the controller 108. NVM 220 may be the NVM 110. DRAM 224 may be the volatile memory 112.

The controller 206 includes a host interface module (HIM) 210 configured to receive and send data between the host device 202 and the controller 206. The controller 206 further includes a command executer 212 coupled to the HIM 210. The command executer 212 may be configured to execute read and write commands received from the host device 202. Furthermore, the controller 206 further includes a data path 214 coupled to the HIM 210 and an error correction engine 216 coupled to the data path 214. When data is received from the host device 202, the data passes through the HIM 210 to the data path 214. The data path 214 may include read gateways, write gateways, registers, and the like. The data is passed to an error correction engine 216, where the data may be encoded with error correction code (ECC) and/or XOR parity data.

After the data is encoded, the data is passed to either DRAM controller 222 or flash interface module (FIM) 218, depending on the relevant write location of the data. The FIM 218 is coupled to the NVM 220, where the FIM 218 accesses and schedules the write to the NVM 220. Likewise, the DRAM controller 222 accesses and schedules the write to DRAM 224. The DRAM controller 222 may be configured to execute a method of partial write accesses utilizing masked write transactions to the DRAM 224.

The controller includes an input/output (I/O) to a logic analyzer 226 via a data bus. The logic analyzer 226 observes the write transactions with all bytes masked transferred between the DRAM controller 222 and the DRAM 224. In some examples, the logic analyzer 226 is coupled to the interface of the DRAM 224. In some examples, the controller 206 may send masked data to the DRAM 224. The masked data is captured by the logic analyzer 226, such that the masked data may be used to help in debug mode. For example, the masked data may include debug events and other informative events. In another example, the controller 206 issues dummy write commands towards the DRAM 224 on purpose. The dummy write commands are ignored by the DRAM 224 but are captured by the logic analyzer 226. The data of the dummy write commands are masked, and the dummy write commands include debug information, according to certain embodiments.

The controller 206 further includes one or more processors 208. The one or more processors 208 may be configured to perform calculations that run the controller 206 or the data storage device 204. The one or more processors 208 may perform arithmetical, logical, input/output (I/O) and other basic instructions that are passed from the data storage device 204 firmware or the host device 202.

Figure 3:
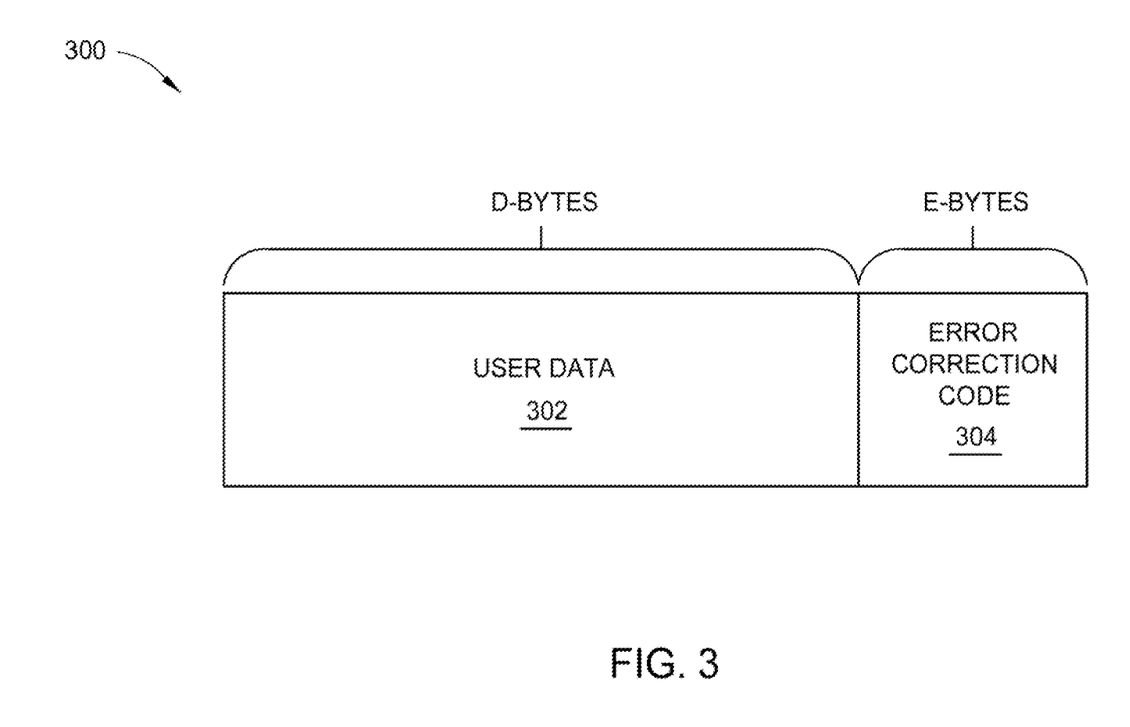
FIG. 3 depicts a schematic block diagram of an error correction code (ECC) codeword, according to certain embodiments.

FIG. 3 depicts a schematic block diagram 300 of a data packet that includes user data 302 and an error correction code (ECC) codeword 304, according to certain embodiments. The data packet includes user data 302 and ECC codeword 304 to be sent to the DRAM, such as the DRAM 224 of FIG. 2. The user data 302 may be "D" number of bytes of user data in the packet, and the ECC codeword 304 may be "E" number of bytes of ECC. In the current example, "D" equals 128 bytes, and "E" equals 2 bytes. It is to be understood that the previously described values are not intended to be limiting, but to provide an example of a possible embodiment. Logically, the data packet may be stored either contiguously or non-contiguously in the DRAM 224. In a non-contiguous storing example, the user data 302 contiguously in one area of the DRAM 224, and the ECC codeword 304 is store contiguously in another area of the DRAM 224.

Figure 4:
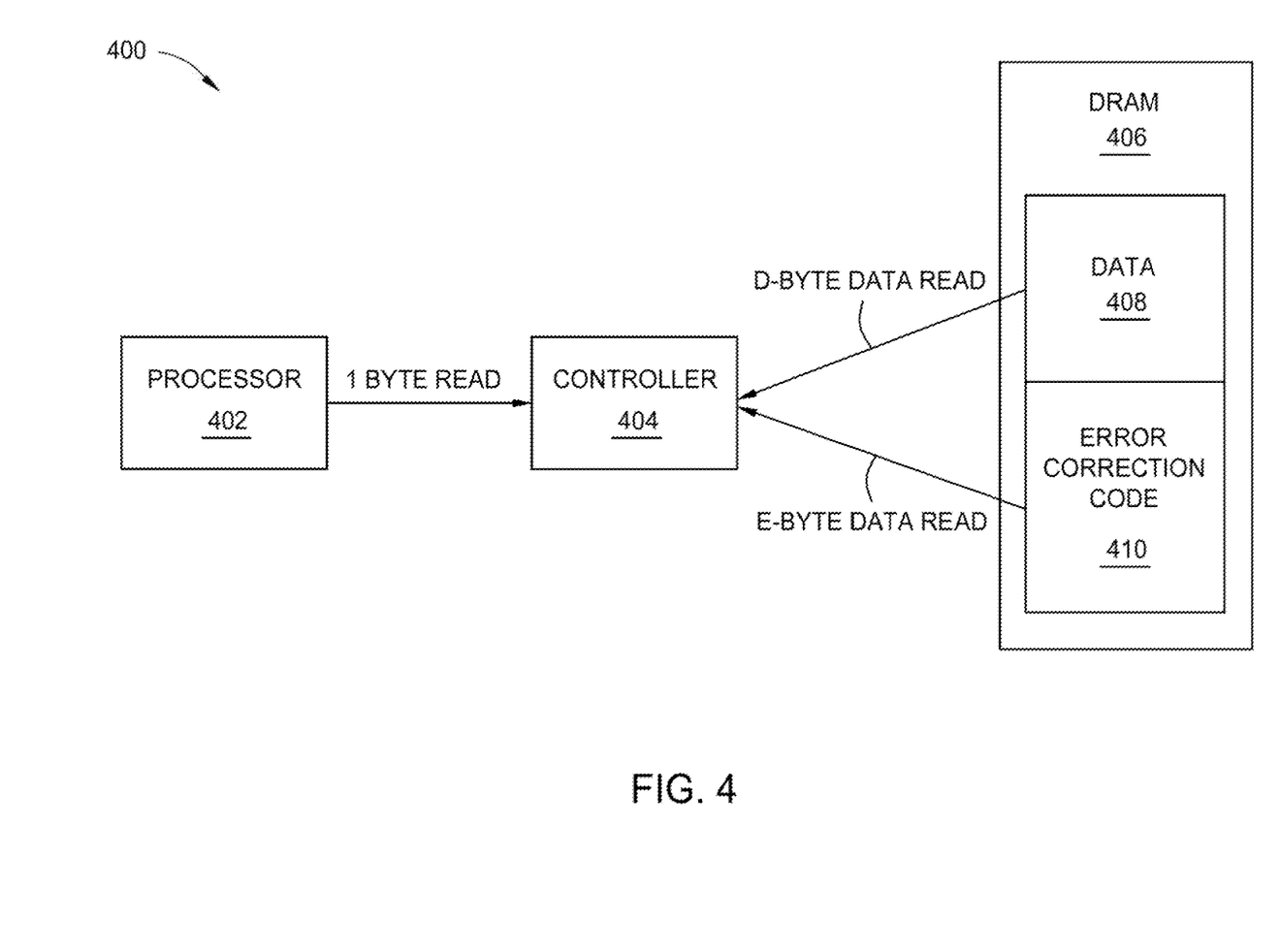
FIG. 4 depicts a schematic block diagram of a partial read, according to certain embodiments.

FIG. 4 depicts a schematic block diagram 400 of a system for performing a partial read, according to certain embodiments. Because a plurality of data packets, such as the data packet of FIG. 3, may be stored non-contiguously, such as in the non-contiguous example of FIG. 3, several transactions may be issued by a controller 404 to read a single frame. For example, when a processor 402, such as one of the one or more processors 208 of FIG. 2, requests to read 1 byte from a DRAM 406, such as DRAM 224 of FIG. 2, the packet, including data 408 and an ECC 410, is transferred from their respective locations in the DRAM 406. A single byte is not able to be transferred from the DRAM 406 due to the ECC 410 protection. After receiving the packet from the DRAM 406, the controller 404 extracts the requested 1 byte and returns the 1 byte to the processor 402.

In another example, the processor 402 may issue a 4 byte write operation to the DRAM 406. Because the 4 byte write operation is not in a size of a user data chunk, such as the D-bytes of user data 302 of FIG. 3, the write operation is a partial write request. Partial write requests have a size that is unaligned with the D-bytes of user data. Thus, in order to write the data to the DRAM 406, a read-modify-write operation is required. The controller 404 may utilize logic to fetch the relevant D-bytes and E-bytes of the packet from the DRAM 406. After fetching the packet, the packet is decoded by an error correction engine, such as the error correction engine 216 of FIG. 2. If there is no error found, then the partial write data is merged with the read data (i.e., the packet retrieved) and the error correction engine 216 encodes the merged data. The merged data and the ECC data are programmed to the relevant locations of the DRAM 406.

Figure 5:
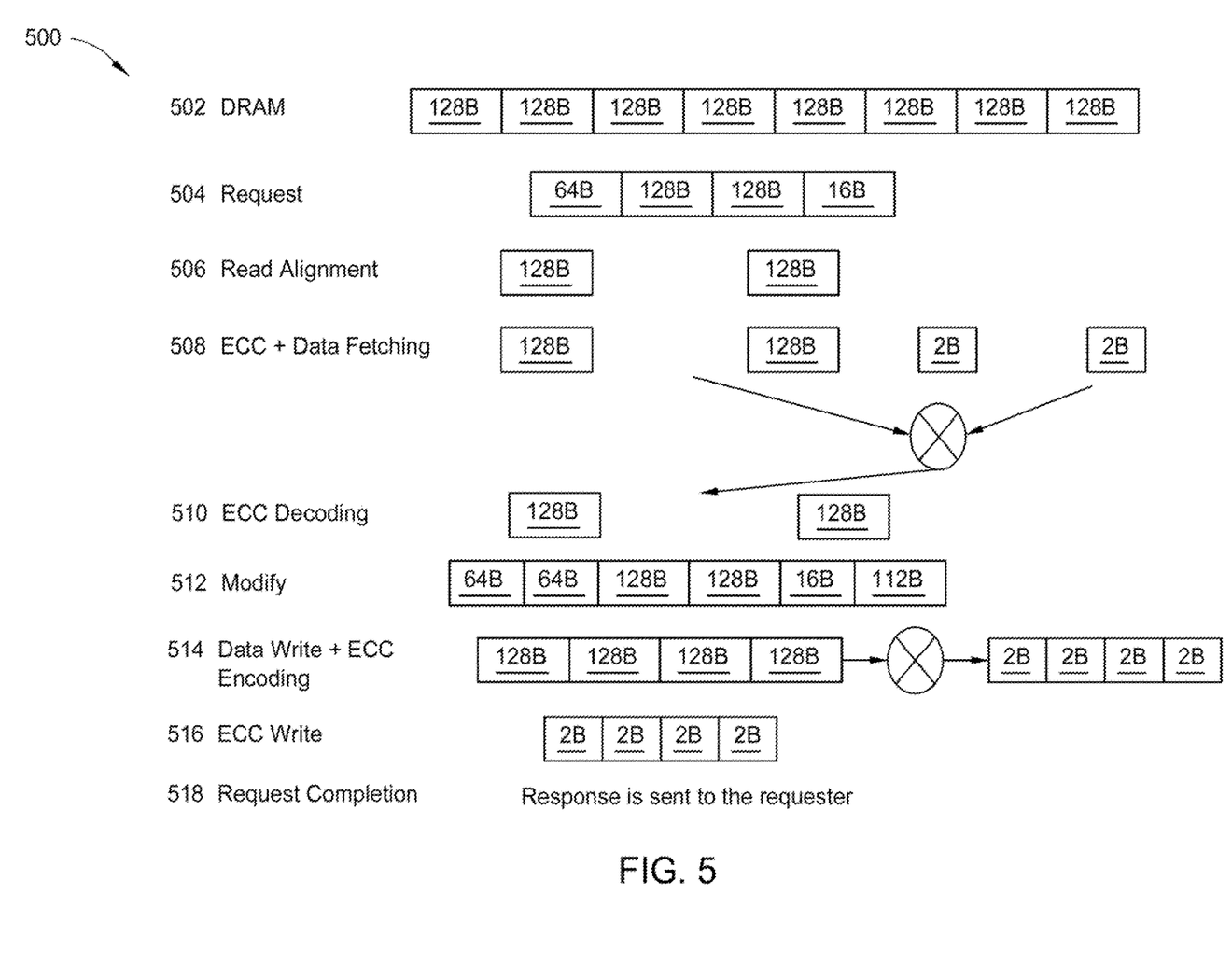
FIG. 5 depicts a schematic illustration of a partial write flow, according to certain embodiments.

FIG. 5 depicts a schematic illustration 500 of a partial write flow, according to certain embodiments. Aspects of FIG. 4 may be utilized in the description of FIG. 5. A DRAM 502 may be the same as the DRAM 406 of FIG. 4. The DRAM 502 comprises both user data, such as the user data 302 of FIG. 3, and ECC data, such as the ECC codeword 304 of FIG. 3. The user data may be in a size of D-bytes and the ECC data may be in a size of E-bytes, where the D-bytes equals 128 bytes and the E-bytes equals 2 bytes. FIG. 5 illustrates the user data section of the DRAM 502 as the user data and the ECC data are non-contiguously stored in the DRAM 502.

A processor, such as the processor 402, sends a partial write request 504 to a controller, such as the controller 404. The partial write request 504 includes a first section that includes 64 bytes, a second section that includes 128 bytes, a third section that includes 128 bytes, and a fourth section that includes 16 bytes. The head of the packet (i.e., the first section) and the tail of the packet (i.e., the fourth section) are unaligned with the user data size. At read alignment 506, the head of the first section and the tail of the fourth section (i.e., the unaligned data sections) are aligned with the size of the 128 bytes of user data.

At the ECC and data fetching 508, the relevant user data associated with the first section and the fourth section, in this example, and the associated ECC data are fetched from the DRAM 406. At the ECC decoding 510, the retrieved data and ECC data are decoded. During ECC decoding 510, the error correction engine, such as the error correction engine 216 of FIG. 2, checks for any uncorrectable errors, such as bit flips or failed bits. If there are no uncorrectable errors, then at modify 512, the retrieved data is merged with the partial write request 504.

The merged data is encoded and transferred to the relevant of the DRAM 406 at data write and ECC encoding 514. At the ECC write 516, the ECC data is written to the appropriate location in the DRAM 406. After the ECC data is written to the appropriate location, the partial write request is completed 518.

Figure 6:
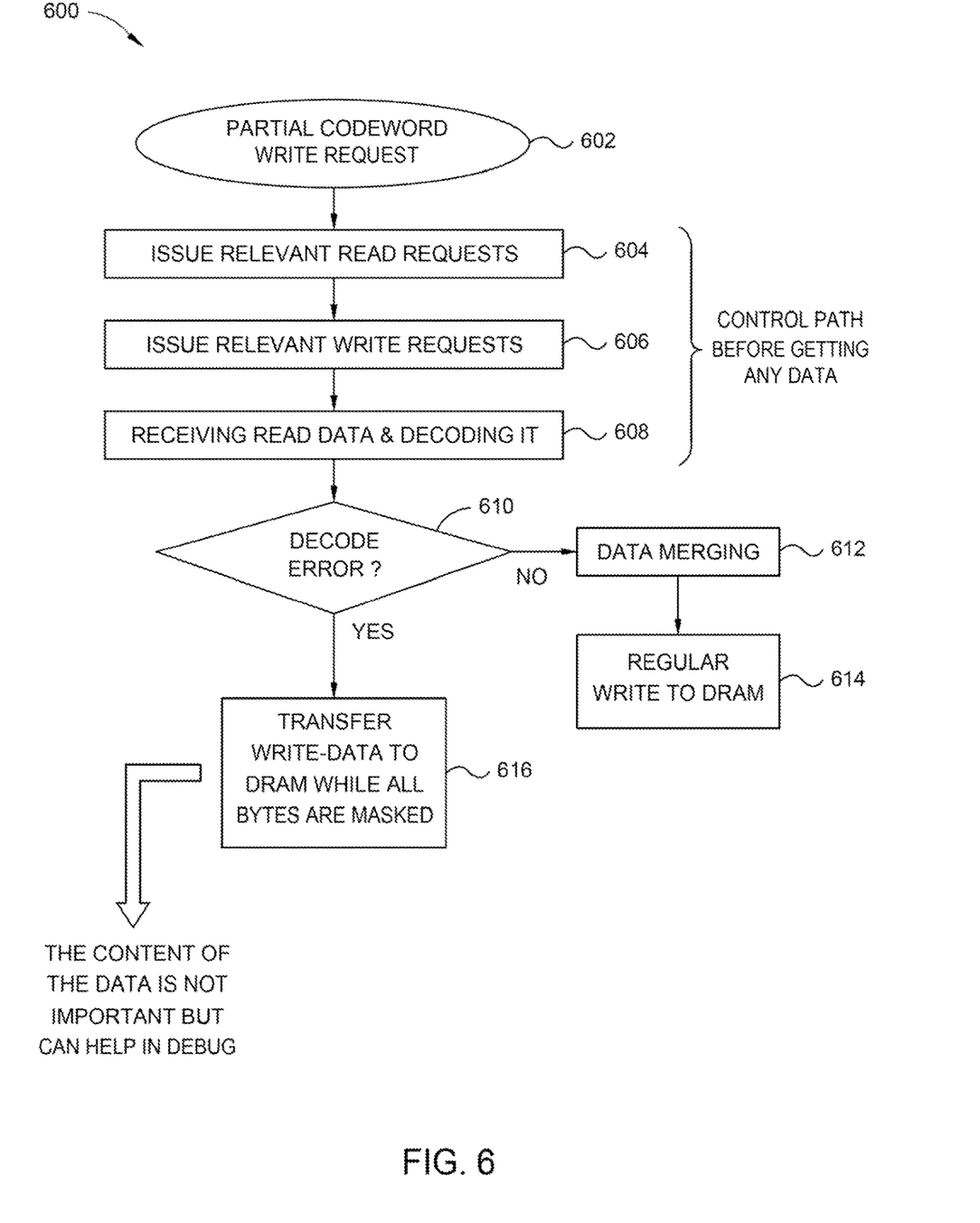
FIG. 6 depicts a flowchart illustrating a method of partial write accesses, according to certain embodiments.

FIG. 6 depicts a flowchart 600 illustrating a method of partial write accesses, according to certain embodiments. At block 602, the partial codeword write request is received by a controller, such as the controller 404 of FIG. 4, from a processor, such as the processor 402 of FIG. 4. At block 604, the controller 404 issues the relevant read requests to retrieve data from the relevant locations of a DRAM, such as the DRAM 406 of FIG. 4. Before retrieving any data from the DRAM 406, the controller 404 issues the relevant write request associated with the partial codeword write request at block 606. In some examples, the read request of block 604 and the write request of block 606 may be issued simultaneously.

At block 608, the relevant data and ECC data associated with the partial codeword write request is received from the DRAM 406 and decoded. At block 610, the controller 404 determines if there is a decoding error. If there is no decoding error at block 610, the decoded data is merged with the partial codeword write request data at block 612. The merged data and ECC data associated with the merged data are programmed normally to the respective locations of the DRAM 406 at block 614. However, if there is a decoding error at block 610, then the write data is transferred to the DRAM while all bytes associated with the data are masked at block 616. A logic analyzer, such as the logic analyzer 226, may track the location of the masked bytes in order to increase visibility when debugging failures as the masked bytes may hold debug information associated with the decoding error.

Table 1 below illustrates the structure of the DRAM transaction in ×8 DRAM write DQ mode. The packet holds 8-bytes of data. Each byte of data has a data mask bit associated with the data byte. When a specific data mask bit is set, the relevant byte of data is ignored by the DRAM. The logic analyzer 226 tracks the location of the data mask bits. The packet may optionally include cyclic redundancy check (CRC) code rather than ECC data.

TABLE 1

| | Data Transfer | | | | | | | |
|---|---|---|---|---|---|---|---|---|
| | 0 | 1 | 2 | 3 | 4 | 5 | 6 | 7 |
| DQ [7:0] | Byte 0 | Byte 1 | Byte 2 | Byte 3 | Byte 4 | Byte 5 | Byte 6 | Byte 7 |
| Data Mask | DM0 | DM1 | DM2 | DM3 | DM4 | DM5 | DM6 | DM7 |
| CRC | | | | CRC | | | | |

Table 2 below illustrates the structure of the DRAM transaction in ×16 DRAM write DQ mode. The packet holds 16-bytes of data. Each byte of data has a data mask bit associated with the data byte. When a specific data mask bit is set, the relevant byte of data is ignored by the DRAM. The logic analyzer 226 tracks the location of the data mask bits. The packet may optionally include cyclic redundancy check (CRC) code rather than ECC data.

TABLE 2

| | Data Transfer | | | | | | | |
|---|---|---|---|---|---|---|---|---|
| | 0 | 1 | 2 | 3 | 4 | 5 | 6 | 7 |
| DQL [7:0] | LByte 0 | LByte 1 | LByte 2 | LByte 3 | LByte 4 | LByte 5 | LByte 6 | LByte 7 |
| Data Mask | DML0 | DML1 | DML2 | DML3 | DML4 | DML5 | DML6 | DML7 |
| DQU [7:0] | UByte 0 | UByte 1 | UByte 2 | UByte 3 | UByte 4 | UByte 5 | UByte 6 | UByte 7 |
| Data Mask | DMU0 | DMU1 | DMU2 | DMU3 | DMU4 | DMU5 | DMU6 | DMU7 |
| CRC | | | | CRC | | | | |

Figure 7:
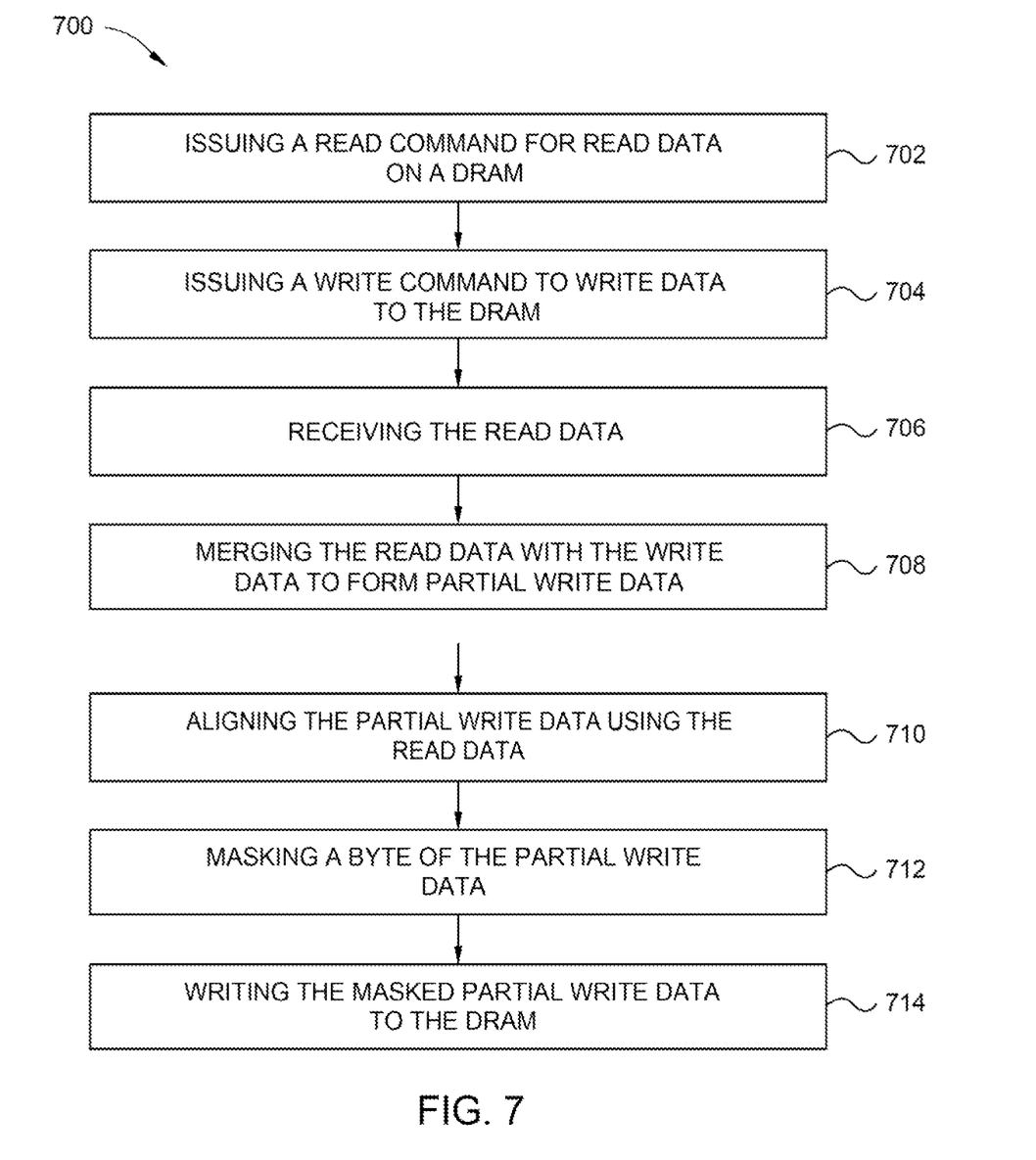
FIG. 7 depicts a flowchart illustrating a method of using a data mask in embedded DRAM, according to certain embodiments.

FIG. 7 depicts a flow diagram of an example method 700 of using a data mask in embedded DRAM, according to certain embodiments. Aspects of FIG. 2 may be used to describe the method 700. At block 702, a controller, such as the controller 206 of FIG. 2, issues a read command for read data on a DRAM, such as the DRAM 224 of FIG. 2, in response to receiving a host command from the host device, such as the host device 202 of FIG. 2. The host command includes unaligned write data. The read command for byte alignment includes retrieving relevant data and ECC data from the DRAM 224. At block 704, the controller 206 issues a write command to write data to the DRAM 224. The write command may be issued immediately after the read command is issued at block 704, but before data is retrieved from the DRAM 224.

At block 706, the read data is received by the controller 206 from the DRAM 224 in response to the read command at block 702. At block 708, read data is merged with the write data to form partial write data. At block 710, the partial write data is aligned using the read data, such as LBA's from the read data. The unaligned write data may be modified such that the head and/or the tail of the unaligned write data is aligned with the size of the user data size (i.e., the D-byte size). At block 712, at least one byte of the partial write data is marked. In certain embodiments the byte is masked as a result of an error having been found in the read data. In certain embodiments, the masked byte may include debug data that can be read by a logic analyzer such as logic analyzer 226. At block 714, the masked partial write data is written to the DRAM 224.

By issuing a write request for a partial write operation with the read request, either simultaneously or before receiving the data of the read request, the data storage device performance may be increased while executing the partial write operation. Likewise, the control and data transfer paths to the DRAM may be simplified due to the separation of the control and data transfer paths. Furthermore, the masked data that holds valuable debug information may be more visible due to the separation of the control and data transfer paths, thus improving visibility when debugging failures.

In one embodiment, a data storage device includes one or more memory devices and a controller configured to perform a method for masking errors in a DRAM write. The method includes issuing a read command for byte alignment data on a DRAM in response to a host command comprising an unaligned write data, issuing a write command, to write modified data to the DRAM, receiving the byte alignment data from the DRAM in response to the read command, modifying the unaligned write data with the byte alignment data to generate the write modified data, performing error detection on the write modified data and detecting an error in at least one byte, masking the at least one byte of the write modified data, and writing masked write modified data to the DRAM.

The error is an uncorrectable error. The method further includes providing the masked write modified data is provided to a logic analyzer. The method further includes generating debug information correlated to the error based on the masked write modified data. The method further includes replacing data comprising the at least one byte with debug data. The data, including the at least one byte, is replaced by dummy data. The dummy data includes debug information.

In another embodiment, a controller for a data storage device includes an I/O to one or more memory devices and a processor configured to execute a method for masking errors in a DRAM write. The method includes receiving a write request from a host comprising write data, the size of the write request being unaligned with stored data of the one or more memory devices, performing a partial write request, issuing a data read command simultaneously with a data write command, detecting an error in the write request, masking bytes of the write data that are indicated as having an error, and writing the write data to the one or more memory devices.

The method further includes writing debug information on the masked bytes. The controller further includes an I/O to a logic analyzer. The method further includes providing the masked bytes to the logic analyzer. The method further includes writing one or more dummy write commands, including debug information, and marking all bytes of the dummy write commands as being masked. The method further includes providing the one or more dummy write commands to a logic analyzer. The detected error is an uncorrectable error. The debug information is correlated to the detected error.

In another embodiment, a system for storing data includes one or more memory means, and a controller means configured to carry out a method for masking errors in a DRAM write. The method includes receiving write data from a host, issuing a partial write request, receiving read data from the one or more memory means, receiving byte alignment data, modifying the write data based on the byte alignment data, detecting an error in a byte of the modified write data, and masking the byte.

The method further includes writing debug data to the byte. The method further includes providing the modified write data and masked byte to a logic analyzer and reading the debug data at the logic analyzer. The debug data is correlated to the error. The error is uncorrectable. The method further includes generating an ECC for the byte.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory devices;
   a logic analyzer; and
   a controller coupled to the one or more memory devices and the logic analyzer, wherein the controller is configured to perform a method for masking errors in a dynamic random access memory (DRAM) write, and wherein the method comprises:
      issuing a read command for read data on a DRAM;
      issuing a write command to write data to the DRAM;
      receiving the read data;
      performing error detection on the read data and detecting an error in a byte;
      merging the read data with the write data to form partial write data;
      aligning the partial write data using the read data;
      masking the byte of the partial write data, wherein a location of the masked byte is tracked by the logic analyzer, and wherein tracking the location increases visibility of the masked byte; and
      writing the masked partial write data to the DRAM.

2. The data storage device of claim 1, wherein the error is an uncorrectable error.

3. The data storage device of claim 2, wherein the method further comprises providing the masked byte of the partial write data is provided to a logic analyzer.

4. The data storage device of claim 3, wherein the method further comprises generating debug information correlated to the error based on the masked byte.

5. The data storage device of claim 4, wherein the method further comprises replacing data comprising the byte with debug data.

6. The data storage device of claim 1, wherein the data comprises the byte is replaced by dummy data.

7. The data storage device of claim 6, wherein the dummy data comprises debug information.

8. A controller for a data storage device, comprising:
   an input/output (I/O) to one or more memory devices; and
   a processor configured to execute a method for masking errors in a dynamic random access memory (DRAM) write, wherein the method comprises:
      issuing a read command for read data, that includes read alignment data;
      issuing a write command;
      detecting an error in read data;
      masking bytes of the read data that are indicated as having an error, wherein a location of the masked bytes is tracked by a logic analyzer coupled to the controller, and wherein tracking the location increases visibility of the masked bytes;
      combining the read data and write data to form partial write data; and
      writing the partial write data to the one or more memory devices based on the read alignment data.

9. The controller of claim 8, wherein the method further comprises writing debug information on the masked bytes.

10. The controller of claim 9, further comprising an I/O to a logic analyzer, the method further comprises providing the masked bytes to the logic analyzer.

11. The controller of claim 10, wherein the detected error is an uncorrectable error.

12. The controller of claim 11, wherein the debug information is correlated to the detected error.

13. The controller of claim 8, wherein the method further comprises writing one or more dummy write commands comprising debug information, and marking all bytes of the dummy write commands as being masked.

14. The controller of claim 13, wherein the method further comprises providing the one or more dummy write commands to a logic analyzer.

15. A system for storing data, comprising:
   one or more memory means;
   a logic analyzer; and
   a controller coupled to the one or more memory means and the logic analyzer, wherein the controller is configured to carry out a method for masking errors in a dynamic random access memory (DRAM) write, and wherein the method comprises:
      executing a partial write command, wherein executing a partial write command comprises:
         issuing a read data command;
         issuing a write command comprising write data;
         receiving read data from the one or more memory means;
         receiving byte alignment data;
         modifying the write data based on the byte alignment data;
         detecting an error in a byte of the modified write data;
         masking the byte, wherein a location of the masked byte is tracked by the logic analyzer, and wherein tracking the location increases visibility of the masked byte; and
         combining the read data, write data, and masked byte.

16. The system of claim 15, wherein the method further comprises writing debug data to the masked byte.

17. The system of claim 16, wherein the method further comprises providing the read data and masked byte to a logic analyzer and reading the debug data at the logic analyzer.

18. The system of claim 17, wherein the debug data is correlated to the error.

19. The system of claim 18, wherein the error is uncorrectable.

20. The system of claim 19, wherein the method further comprises generating an error correction code (ECC) for the byte.

* * * * *